(12) United States Patent
Kudaev (10) Patent No.: US 12,529,597 B2
(45) Date of Patent: Jan. 20, 2026

(54) OPTOELECTRONIC MEASURING DEVICE FOR MEASURING THE INTENSITY OF ELECTROMAGNETIC RADIATION IN A FREQUENCY-RESOLVED MANNER

(71) Applicant: OSRAM Opto Semiconductors GmbH, Regensburg (DE)

(72) Inventor: Sergey Kudaev, Regensburg (DE)

(73) Assignee: OSRAM Opto Semiconductors GmbH, Regensburg (DE)

(*) Notice: Subject to any disclaimer, the term of this patent is extended or adjusted under 35 U.S.C. 154(b) by 221 days.

(21) Appl. No.: 17/630,170

(22) PCT Filed: Jul. 16, 2020

(86) PCT No.: PCT/EP2020/070157
§ 371 (c)(1),
(2) Date: Jan. 26, 2022

(87) PCT Pub. No.: WO2021/018617
PCT Pub. Date: Feb. 4, 2021

(65) Prior Publication Data
US 2022/0283027 A1    Sep. 8, 2022

(30) Foreign Application Priority Data
Jul. 30, 2019  (DE) ..................... 10 2019 211 277.3

(51) Int. Cl.
*G01J 3/02* (2006.01)
(52) U.S. Cl.
CPC ........... *G01J 3/0294* (2013.01); *G01J 3/0208* (2013.01); *G01J 3/0229* (2013.01); *G01J 3/0259* (2013.01); *G01J 3/0262* (2013.01)
(58) Field of Classification Search
CPC ...... G01J 3/0294; G01J 3/0208; G01J 3/0229; G01J 3/0259; G01J 3/0262
See application file for complete search history.

(56) References Cited

U.S. PATENT DOCUMENTS

2008/0204744 A1   8/2008  Mir et al.
2008/0258187 A1*  10/2008  Ladd ................ H01L 27/14603
                                                           257/292
(Continued)

FOREIGN PATENT DOCUMENTS

CN    102735341 A    10/2012
CN    103913226 A     7/2014
(Continued)

OTHER PUBLICATIONS

Fossum, Eric R., and Donald B. Hondongwa. "A review of the pinned photodiode for CCD and CMOS image sensors." IEEE Journal of the electron devices society (2014)) (Year: 2014).*

(Continued)

*Primary Examiner* — Uzma Alam
*Assistant Examiner* — Mohamed Doumbia
(74) *Attorney, Agent, or Firm* — VIERING, JENTSCHURA & PARTNER mbB (57) ABSTRACT

An optoelectronic measuring device may be used for the frequency-resolved measurement of an intensity of electromagnetic radiation. The device may include a plurality of measurement channels. A first of the measurement channels may have a first spectral sensitivity, and a further of the measurement channels may have a further spectral sensitivity different from the first spectral sensitivity. The device may further include a plurality of collimators for collimating the electromagnetic radiation. A separate optical path may extend through each of the collimators to one or more of the measurement channels. Each of the measurement channels may be arranged to measure an intensity of the electromagnetic radiation collimated by means of one or more of the collimators. The optoelectronic measuring device may have more collimators as compared to measurement channels.

11 Claims, 5 Drawing Sheets

(56) References Cited

U.S. PATENT DOCUMENTS

| | | |
|---|---|---|
| 2012/0250022 A1 | 10/2012 | Zhou et al. |
| 2013/0208172 A1 | 8/2013 | Tashiro et al. |
| 2015/0069239 A1 | 3/2015 | Kester et al. |
| 2015/0077617 A1 | 3/2015 | Komiya et al. |
| 2015/0233762 A1 | 8/2015 | Goldring et al. |
| 2017/0248472 A1 | 8/2017 | Roentgen et al. |
| 2017/0332022 A1* | 11/2017 | Zhou ............ H04N 23/10 |
| 2018/0136041 A1* | 5/2018 | Knapp .......... G02B 6/3644 |
| 2018/0329035 A1* | 11/2018 | Pacala ........ H01L 31/02027 |
| 2024/0305767 A1 | 9/2024 | Pacala et al. |

FOREIGN PATENT DOCUMENTS

| | | | |
|---|---|---|---|
| CN | 106796146 A | 5/2017 | |
| DE | 102017218187 A1 | 4/2019 | |
| DE | 202017007509 U1 | 3/2022 | |
| WO | 0005556 A1 | 2/2000 | |
| WO | WO-2007008826 A2 * | 1/2007 | ............ H04N 25/41 |
| WO | 2013173541 A1 | 11/2013 | |
| WO | 2015015493 A2 | 2/2015 | |
| WO | 2019055771 A1 | 3/2019 | |
| WO | WO-2019101750 A2 * | 5/2019 | ............ G01J 3/0208 |

OTHER PUBLICATIONS

International Search Report issued for the corresponding International application No. PCT/EP2020/070157, dated Oct. 19, 2020, 3 pages (for informational purposes only).

German Search Report issued for the German application No. 10 2019 211 277.3, dated Feb. 28, 2020, 9 pages (for informational purposes only).

Chinese office action issued for the corresponding Chinese application No. 2020800556069, dated Dec. 18, 2023, 7 pages (for informational purposes only).

Chinese Decision of Rejection for corresponding Chinese patent application No. 2020800556069, dated Jun. 27, 2024, 8 pages, (for informational purposes only).

German office action issued for the corresponding German patent application No. 112020003621.9, dated May 22, 2025, 5 pages (for informational purposes only).

* cited by examiner

OPTOELECTRONIC MEASURING DEVICE FOR MEASURING THE INTENSITY OF ELECTROMAGNETIC RADIATION IN A FREQUENCY-RESOLVED MANNER

CROSS-REFERENCE TO RELATED APPLICATIONS

The present application is a national stage entry according to 35 U.S.C. § 371 of PCT application No.: PCT/EP2020/070157 filed on Jul. 16, 2020; which claims priority to German Patent Application Serial No.: 10 2019 211 277.3 filed on Jul. 30, 2019; all of which are incorporated herein by reference in their entirety and for all purposes.

TECHNICAL FIELD

The disclosure relates to an optoelectronic measuring device for the frequency-resolved measurement of an intensity of electromagnetic radiation, and to an associated method. Such optoelectronic measuring devices are also referred to as spectrometers.

BACKGROUND

Such an optoelectronic measuring device may comprise a plurality of measurement channels, a first of the measurement channels having a first spectral sensitivity and a further of the measurement channels having a further spectral sensitivity, which differs from the first spectral sensitivity.

The object is to provide a particularly sensitive and compact optoelectronic measuring device for the frequency-resolved measurement of an intensity of electromagnetic radiation, and a corresponding method for the frequency-resolved measurement of an intensity of electromagnetic radiation.

SUMMARY

Such an optoelectronic measuring device for the frequency-resolved measurement of an intensity of electromagnetic radiation comprises at least two measurement channels, a first of the measurement channels having a first spectral sensitivity and a further of the measurement channels having a further spectral sensitivity, which differs from the first spectral sensitivity. The optoelectronic measuring device furthermore comprises at least two collimators for collimating the electromagnetic radiation.

In this case, a separate optical path extends through each of the collimators to one or more of the measurement channels. Furthermore, each of the measurement channels is arranged to measure an intensity of the electromagnetic radiation collimated by means of one or more of the collimators.

The use of a plurality of collimators makes it possible to increase the sensitivity of the optoelectronic measuring device for a predetermined size in comparison with the use of only one collimator.

According to one embodiment, the optoelectronic measuring device comprises at least 5 or at least 10 or at least 50 measurement channels.

According to one embodiment, the optoelectronic measuring device comprises at least 5 or at least 10 or at least 50 collimators.

According to one embodiment, all the measurement channels have different spectral sensitivities. In other words, the measurement channels respectively have a spectral sensitivity which differs from the spectral sensitivities of all other measurement channels.

According to one embodiment, at least one of the collimators comprises a collimation lens and an aperture diaphragm, or it consists thereof. In a non-limiting embodiment, the collimators or at least a plurality of the collimators respectively comprise an aperture diaphragm and a collimation lens, or consist thereof. The aperture diaphragm may be arranged in an optical path before the collimation lens, i.e. the collimation lens is arranged to collimate electromagnetic radiation transmitted through the aperture diaphragm.

An aperture diaphragm (also referred to as an opening diaphragm) refers to a diaphragm which delimits an opening width, here the opening width of the collimator. Such an aperture diaphragm has a diaphragm membrane which is opaque for the electromagnetic radiation and in which at least one opening through which the electromagnetic radiation passes is provided.

According to one embodiment, a diaphragm membrane of the aperture diaphragm of at least one of the collimators is monolithically connected to the lens of this collimator. In a non-limiting embodiment, in the collimators or at least in a plurality of the collimators, a diaphragm membrane of the aperture diaphragm of the respective collimator is monolithically connected to the lens of this collimator. In particular, the diaphragm membrane may comprise or consist of a layer on the lens. This simplifies the production of the collimator. The diaphragm membrane may be produced by coating the collimation lens with the layer.

According to one embodiment, the collimators or at least two of the collimators respectively comprise a collimation lens and an aperture diaphragm, the aperture diaphragms of the at least two collimators having a common diaphragm membrane. This simplifies the production of the collimators.

According to one embodiment, the collimators or at least two of the collimators respectively comprise a collimation lens and an aperture diaphragm, the collimation lenses of the collimators being formed monolithically. This simplifies the production of the collimation lenses; these may for example be produced together in an injection molding method. Furthermore, a lens array formed from such monolithic lenses may be positioned and handled easily.

According to one embodiment, the collimators or at least two of the collimators respectively comprise a collimation lens and an aperture diaphragm, the aperture diaphragms of the collimators having a common diaphragm membrane and the collimation lenses of the collimators being formed monolithically. In this case, the common diaphragm membrane may be monolithically connected to the monolithically connected collimation lenses. In particular, the common diaphragm membrane may comprise or consist of a layer on the monolithically connected collimation lenses. Accordingly, the diaphragm membrane may be produced by coating the monolithically connected collimation lenses with the layer.

According to one embodiment, the optoelectronic measuring device furthermore comprises at least one radiation absorption element, which is arranged between two of the collimators. In this way, a crosstalk between the collimators may be avoided and the collimation may be improved. Ideally, the optoelectronic measuring device comprises k collimators and at least k−1 radiation absorption elements. A radiation absorption element may then be arranged between all collimators.

Such a radiation absorption element is advantageous in particular when it is arranged between two collimators which respectively comprise a collimation lens and an aperture diaphragm as described above. In this case, the radiation absorption element may be arranged between the diaphragm membranes of the aperture diaphragms and the (optionally monolithically formed) collimation lenses or may be arranged between a common diaphragm membrane of the aperture diaphragms and the (optionally monolithically formed) collimation lenses. As an alternative or in addition, it may also be arranged between the collimation lenses of the two collimators.

According to one embodiment, at least one of the measurement channels comprises a radiation detection element and a spectral filter. In a non-limiting embodiment, the measurement channels, or at least a plurality of the measurement channels, respectively comprise a radiation detection element and a spectral filter. The spectral filter may be arranged to filter the electromagnetic radiation before detection by the radiation detection element.

According to one embodiment, the optoelectronic measuring device comprises precisely one assigned collimator per measurement channel, the measurement channel being arranged to register the electromagnetic radiation collimated by means of the respectively assigned collimator. For example, the measurement channels are arranged to register predominantly the electromagnetic radiation collimated by means of the respectively assigned collimator, i.e. at least 50% or 70% or even 90% of the electromagnetic radiation registered by the respective measurement channel comes from the assigned collimator. The measurement channels may also be arranged to register only the electromagnetic radiation collimated by means of the respectively assigned collimator, i.e. 100% of the electromagnetic radiation registered by the respective measurement channel comes from the assigned collimator.

The optoelectronic measuring device comprises more collimators than measurement channels. This means that the optoelectronic measuring device comprises at least two measurement channels, a first of the measurement channels having a first spectral sensitivity and a further of the measurement channels having a further spectral sensitivity, which differs from the first spectral sensitivity, and furthermore more collimators for collimating the electromagnetic radiation than measurement channels, a separate optical path extending through each of the collimators to one or more of the measurement channels and each of the measurement channels being arranged to measure an intensity of the electromagnetic radiation collimated by means of one or more of the collimators.

According to one embodiment, a plurality, such as 2, 5 or 25, of the measurement channels, or the measurement channels, are respectively assigned precisely n collimators, where n is a natural number greater than or equal to two, in such a way that these measurement channels are arranged to register the electromagnetic radiation collimated by means of the respectively assigned collimators. For example, the measurement channels are arranged to register predominantly the electromagnetic radiation collimated by means of the assigned collimators, i.e. at least 50% or at least 70% or even at least 90% of the electromagnetic radiation registered by the respective measurement channel comes from the assigned collimators. The measurement channels may also be arranged to register only the electromagnetic radiation collimated by means of the respectively assigned collimators, i.e. 100% of the electromagnetic radiation registered by the respective measurement channel comes from the assigned collimators. Owing to the larger number of collimators, the size of the optoelectronic measuring device may be further reduced, in which case at the same time it may be ensured easily that the collimators influence the intensity of the electromagnetic radiation in the same way for all the measurement channels.

According to one embodiment, the optoelectronic measuring device furthermore comprises at least one scattering element. This may be arranged in an optical path before the collimators, or at least a plurality of the collimators. This means that the collimators, or at least a plurality of the collimators, are arranged to collimate the electromagnetic radiation scattered by the scattering element.

According to one embodiment, the optoelectronic measuring device comprises at least one radiation distribution means, which is adapted and arranged to distribute electromagnetic radiation, which is incident on the optoelectronic measuring device, among the collimators, or at least a plurality of the collimators.

This may be the above-described scattering element, or the radiation distribution means may comprise such a scattering element. As an alternative or in addition, the radiation distribution means may for example also comprise or consist of a light guide, the light guide being arranged to distribute the electromagnetic radiation among the collimators.

According to one embodiment, a method for the frequency-resolved measurement of an intensity of electromagnetic radiation comprises the step of measuring the intensity of the electromagnetic radiation by means of at least two measurement channels, a first of the measurement channels having a first spectral sensitivity and a further of the measurement channels having a further spectral sensitivity, which differs from the first spectral sensitivity, and the step of collimating the electromagnetic radiation by means of at least two collimators before the step of measuring the intensity. In this case, a separate optical path extends through each of the collimators to one or more of the measurement channels, and each of the measurement channels measures the intensity of the electromagnetic radiation collimated by means of one or more of the collimators.

In the method, more collimators will be used for collimating the electromagnetic radiation than measurement channels will be used for measuring the intensity.

In the method, the above-described optoelectronic measuring device may be used.

BRIEF DESCRIPTION OF THE DRAWINGS

Various embodiments of the solution will be explained in more detail below with the aid of the drawings, in which schematically.

Identical, similar or similar-acting elements are given the same reference signs in the Figures. The Figures and the proportions of the elements shown in the Figures are not to be regarded as true to scale. Rather, individual elements can be shown exaggeratedly large for better representability and/or for better comprehensibility.

DETAILED DESCRIPTION

Figure 1:
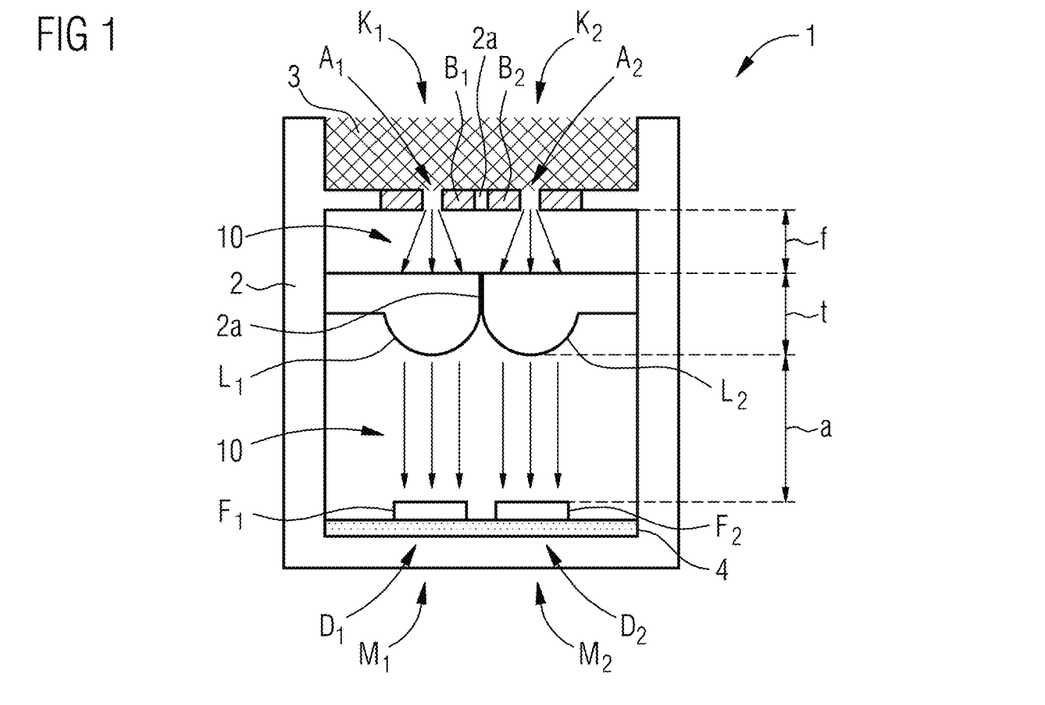
FIG. 1 shows an optoelectronic measuring device according to a first example.

An optoelectronic measuring device 1 according to a first example is schematically represented in FIG. 1. It comprises a housing 2 in which a first collimator $K_1$, a second collimator $K_2$, a first measurement channel $M_1$ and a second measurement channel $M_2$ are arranged. The first collimator $K_1$ comprises a first aperture diaphragm $A_1$ and a first collimation lens $L_1$. The second collimator $K_2$ accordingly comprises a second aperture diaphragm $A_2$ and a second collimation lens $L_2$. The first aperture diaphragm $A_1$ comprises a first diaphragm membrane $B_1$ and the second aperture diaphragm $A_2$ comprises a second diaphragm membrane $B_2$. The first aperture diaphragm $A_1$ is arranged in an optical path before the first collimation lens $L_1$, i.e. the electromagnetic radiation 10 is transmitted first through the first aperture diaphragm $A_1$ and then through the first collimation lens $L_1$. This also applies similarly for the second aperture diaphragm $A_1$ and the second collimation lens $L_2$.

A housing section 2a, which serves as a holder for the diaphragm membranes $B_1$, $B_2$ and the collimation lenses $L_1$, $L_2$, is respectively arranged between the diaphragm membranes $B_1$, $B_2$ and between the collimation lenses $L_1$, $L_2$.

The first measurement channel $M_1$ comprises a first spectral filter $F_1$ and a first radiation detection element $D_1$. In a similar way, the second measurement channel $M_2$ comprises a second spectral filter $F_2$ and a second radiation detection element $D_2$.

Detectors have a sensitive spectral range. This is the wavelength range in which electromagnetic radiation is detected. A detector may have a wavelength-dependent sensitivity, also referred to as spectral sensitivity, so that different wavelengths with the same intensity generate differently strong detector signals, for example voltages or currents.

The two spectral filters $F_1$ and $F_2$ have different filter characteristics, so that the measurement channels $M_1$ and $M_2$ have different spectral sensitivities. Accordingly, the intensity of the electromagnetic radiation 10 may be measured in frequency-resolved fashion with the optoelectronic measuring device 1.

By the collimation of the electromagnetic radiation 10, it is possible to ensure that the measurement channels $M_1$ and $M_2$ have spectral sensitivities substantially independent of an angle of incidence of the electromagnetic radiation 10, even if the filter characteristics of the spectral filters $F_1$, $F_2$ have a strong angle dependency.

The spectral filters $F_1$, $F_2$ may, in particular, be bandpass filters. The filter characteristics of bandpass filters may have a strong angle dependency, particularly when multilayer interference filters are used as bandpass filters.

The radiation detection elements $D_1$ and $D_2$ are a component of a detector array 4. A scattering element 3 for scattering the electromagnetic radiation 10 is arranged before the collimators $K_1$, $K_2$. The radiation detection elements $D_1$, $D_2$ may be identically designed silicon photodiodes.

The optoelectronic measuring device 1 has a plurality of collimators $K_1$ and $K_2$. It has precisely one collimator $K_1$, $K_2$ per measurement channel $M_1$, $M_2$. The collimators $K_1$ and $K_2$ are not "optically connected in series", i.e. the electromagnetic radiation 10 does not pass first through one of the collimators $K_1$, $K_2$ and then through the other of the collimators $K_2$, $K_2$. Rather, the collimators $K_1$, $K_2$ are "optically connected in parallel". This does not mean that the collimators $K_1$, $K_2$ must be aligned parallel, but that a separate optical path extends through each of the collimators $K_1$, $K_2$ to one or more of the measurement channels $M_1$, $M_2$. Accordingly, both the electromagnetic radiation 10 allowed through by the first collimator $K_1$ and the electromagnetic radiation 10 allowed through by the second collimator $K_2$ are available for the measurement.

In comparison with an optoelectronic measuring device having one collimator, collimators $K_1$, $K_2$ with a smaller height may therefore be used. The height of the optoelectronic measuring device 1 is given by the sum of the focal length f of the collimation lenses $L_1$, $L_2$, the thickness t of the lenses and the working distance a, which is equal to the separation between the collimation lenses $L_1$, $L_2$ and the spectral filters $F_1$, $F_2$ and may be equal to zero. Accordingly, the height of the optoelectronic measuring device 1 is limited by the focal length f of the lenses and the thickness t of the lenses $L_1$, $L_2$.

When using only one collimator, in order to register the same intensity of electromagnetic radiation with the optoelectronic measuring device as in the first example here, the aperture diaphragm would have to be selected to be greater than in the present example. In order to obtain the same beam divergence after the collimators as in the present example in such a case, it would be necessary to increase the focal length of the lens and also make the lens larger, so that it also becomes thicker. Accordingly, the height (focal length f and thickness t) of the optoelectronic measuring device 1 is reduced through the use of a plurality of collimators $K_1$, $K_2$ in comparison with the use of only one collimator according to the prior art. Likewise, a sensitivity of the optoelectronic measuring device 1 may be increased through the use of a plurality of collimators $K_1$, $K_2$, by more electromagnetic radiation 10 being brought to the measurement channels $M_1$, $M_2$.

Figure 2:
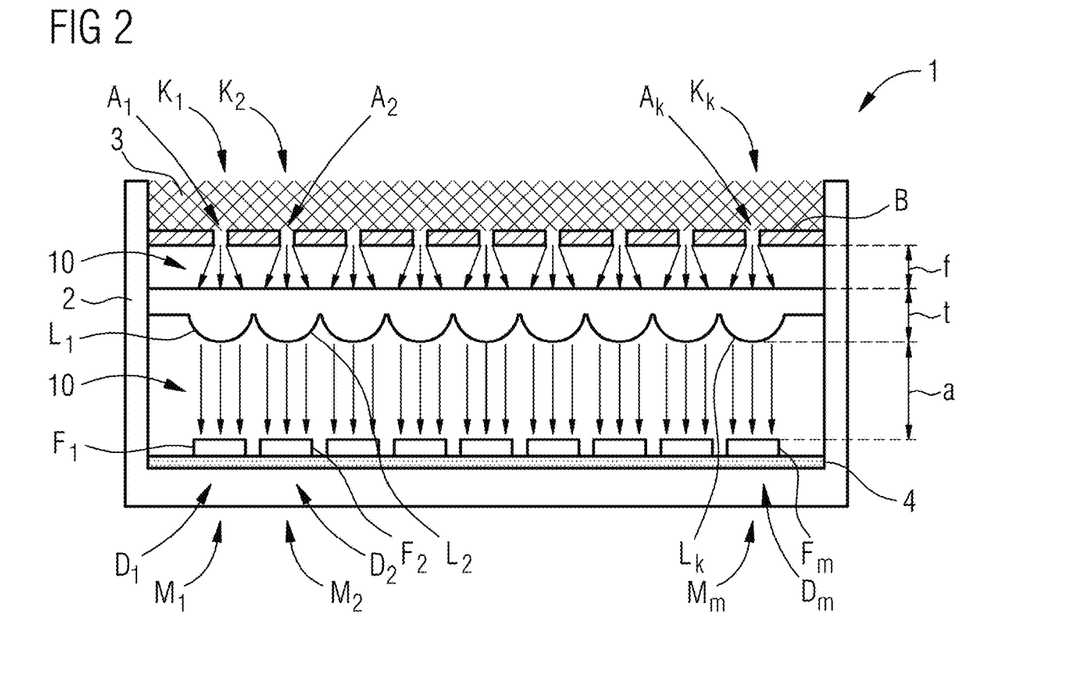
FIG. 2 shows an optoelectronic measuring device according to a second example.

FIG. 2 represents an optoelectronic measuring device 1 according to a second example. It is constructed substantially similarly to that according to the first example. Instead of two measurement channels $M_1$, $M_2$, however, it has m measurement channels $M_1$, $M_2$, where m is a natural number greater than or equal to two, 9 measurement channels being represented here.

Instead of two collimators $K_1$, $K_2$, it furthermore has k collimators $K_1$, $K_2$, . . . , $K_k$, where k is equal to m, i.e. the optoelectronic device has precisely as many collimators as measurement channels. Here, nine collimators $K_1$, $K_2$, . . . , $K_k$ are represented.

All the measurement channels $M_1$, $M_2$, . . . , $M_m$ have different spectral sensitivities. In other words, the measurement channels $M_1$, $M_2$, . . . , $M_m$ respectively have a spectral sensitivity which differs from the spectral sensitivity of all other measurement channels $M_1$, $M_2$, . . . , $M_m$.

Consequently, with the optoelectronic measuring device 1 according to the second example, with the use of more than 2 measurement channels, a frequency-resolved measurement of the intensity of the electromagnetic radiation 10 may be carried out with a more accurate spectral resolution than with the optoelectronic measuring device 1 according to the first example. When using more than 2 collimators $K_1$, $K_2, \ldots, K_k$, this may be done without increasing the height (in particular focal length f and thickness t) of the optoelectronic measuring device 1.

As mentioned, as an alternative to the nine measurement channels and collimators represented, the optoelectronic measuring device 1 may also have a number m of measurement channels M different thereto and a number k of collimators K different thereto. For example, it may have at least 5 or at least 10 or at least 50 measurement channels M and collimators K.

In contrast to the first example, in which there are two diaphragm membranes $B_1$, $B_2$ between which a housing section 2a that serves as a holder for the diaphragm membranes $B_1$, $B_2$ is arranged, the collimators $K_1, K_2, \ldots, K_9$ have a common diaphragm membrane B and the housing section 2a in between is omitted.

The collimation lenses $L_1, L_2, \ldots, L_k$ are formed monolithically, i.e. formed consisting of one piece. For example, they may be produced together in an injection molding method. A lens array formed from such monolithic collimation lenses $L_1, L_2, \ldots, L_k$ may be positioned and handled easily.

In contrast to the optoelectronic measuring device 1 according to the first example, no housing section 2a is accordingly arranged between the collimation lenses $L_1, L_2$.

Figure 3:
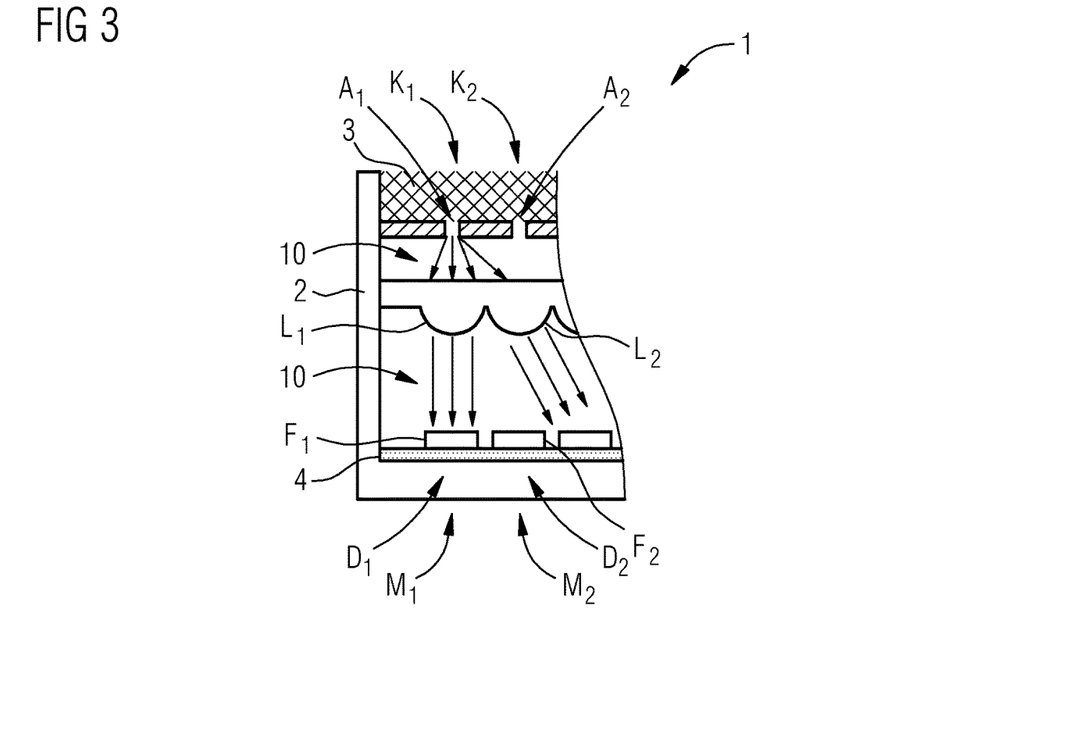
FIG. 3 shows a crosstalk between collimators of the optoelectronic measuring device according to the second example.

As represented in FIG. 3, in the optoelectronic measuring device 1 according to the first and second examples, despite the collimators $K_1, K_2, \ldots, K_k$ it may happen that light impinges obliquely on the measurement channels $M_1, M_2, \ldots, M_m$. Accordingly, electromagnetic radiation 10 which emerges particularly obliquely from one of the aperture diaphragms $A_1, A_2, \ldots, A_k$ may impinge on the collimation lens $L_1, L_2, \ldots, L_k$ of another collimator $K_1, K_2, \ldots, K_k$. FIG. 3 represents the way in which electromagnetic radiation 10 which emerges particularly obliquely from the first aperture diaphragm $A_1$ impinges on the second collimation lens $L_2$ and impinges therefore obliquely and in uncollimated fashion on the measurement channels $M_1, M_2, \ldots, M_m$. The same applies for the optoelectronic measuring device 1 according to the first example, although this is not represented in FIG. 3.

Figure 4:
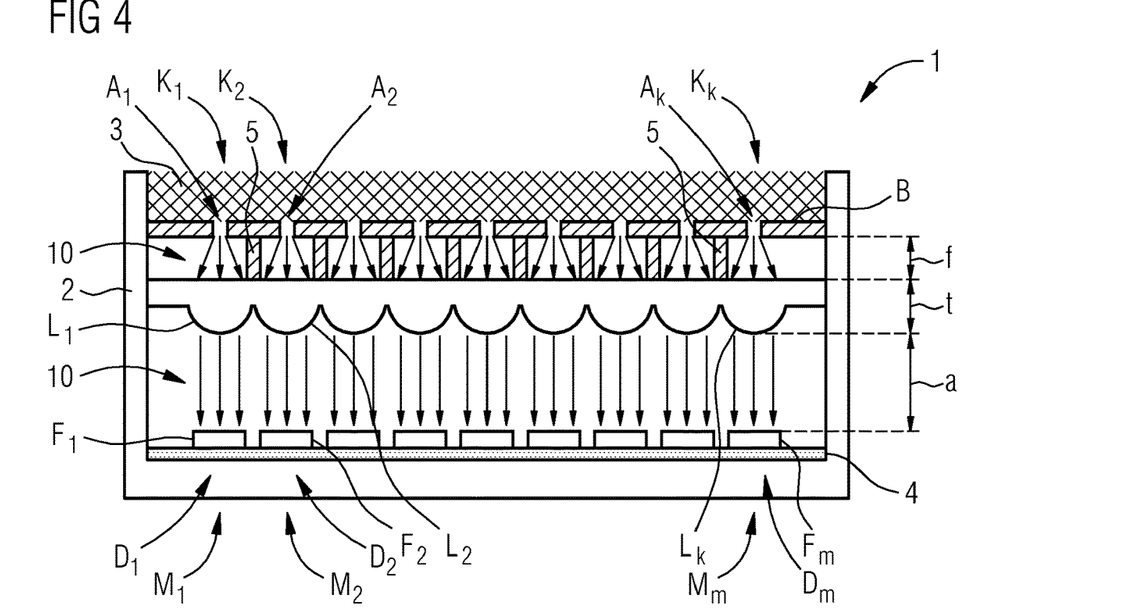
FIG. 4 shows an optoelectronic measuring device according to a third example.

In order to prevent such a crosstalk between the collimators $K_1, K_2, \ldots, K_k$, at least one radiation absorption element 5 may additionally be arranged between the collimators $K_1, K_2, \ldots, K_k$. The optoelectronic measuring device 1 according to a third example, which is represented in FIG. 4, is constructed substantially similarly to the optoelectronic measuring device according to the second example. In contrast to the optoelectronic measuring device 1 according to the second example, however, it has radiation absorption elements 5 of this type between the collimators $K_1, K_2, \ldots, K_k$. In this case, such a radiation absorption element 5 is arranged between all k collimators $K_1, K_2, \ldots, K_k$. The optoelectronic measuring device therefore comprises k−1 radiation absorption elements 5. In the present example, the radiation absorption elements 5 are arranged between the common diaphragm membrane B of the aperture diaphragms $A_1, A_2, \ldots, A_k$ and the collimation lenses $L_1, L_2, \ldots, L_k$.

Figure 5:
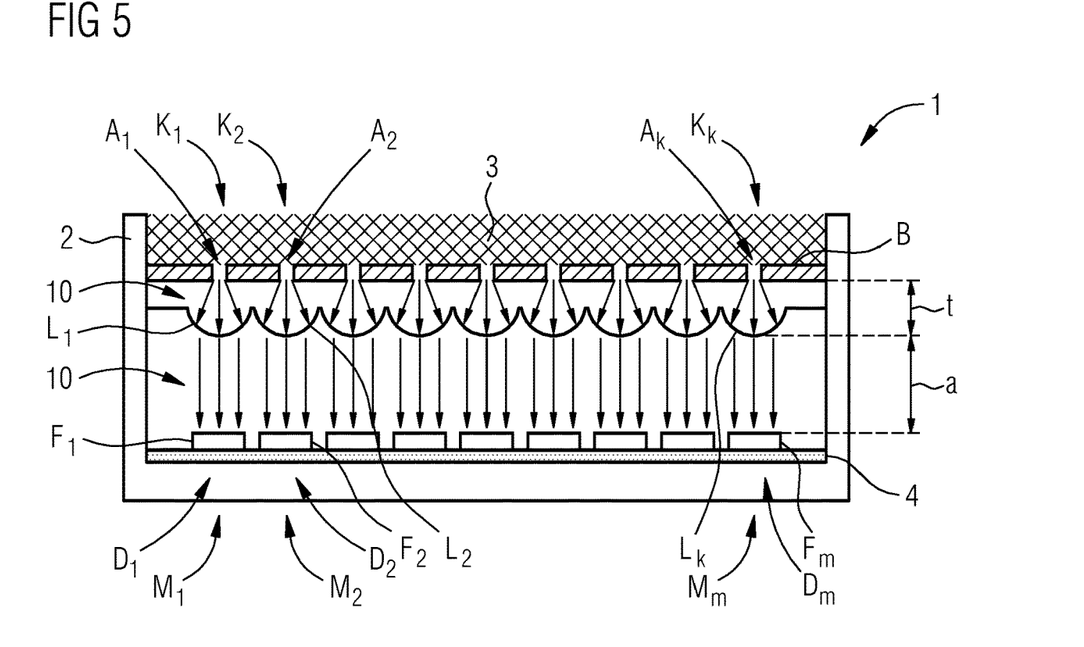
FIG. 5 shows an optoelectronic measuring device according to a fourth example.

The optoelectronic measuring device 1 according to a fourth example, which is represented in FIG. 5, is constructed substantially similarly to the optoelectronic measuring device according to the second example. In contrast to the optoelectronic measuring device 1 according to the second example, however, the common diaphragm membrane B of the collimators $K_1, K_2, \ldots, K_k$ is a layer on the lens array formed by the collimation lenses $L_1, L_2, \ldots, L_k$ monolithically connected to one another. Accordingly, it is monolithically connected to the collimation lenses $L_1, L_2, \ldots, L_k$. In this case, the collimation lenses $L_1, L_2, \ldots, L_k$ may be configured in such a way that their focal point lies in the plane of the diaphragm membrane B.

In contrast to the optoelectronic measuring device 1 according to the third example, the optoelectronic measuring device 1 according to the fourth example, which is represented in FIG. 5, does not have any radiation absorption elements 5. As an alternative thereto, radiation absorption elements 5 may however also be provided in the optoelectronic measuring device 1 according to the fourth example, for example between the collimation lenses $L_1, L_2, \ldots, L_k$ of the collimators $K_1, K_2, \ldots, K_k$.

The optoelectronic measuring devices 1 according to examples one to four, which have been discussed above, comprise precisely one assigned collimator $K_1, K_2, \ldots, K_k$ per measurement channel $M_1, M_2, \ldots, M_m$. In this case, the measurement channel $M_1, M_2, \ldots M_m$ is arranged to register predominantly the electromagnetic radiation 10 collimated by means of the respectively assigned collimator $K_1, K_2, \ldots, K_k$, i.e. at least 50% of the electromagnetic radiation 10 registered by the respective measurement channel $M_1, M_2, \ldots, M_m$ comes from the assigned collimator $K_1, K_2, \ldots, K_k$. Accordingly, the optoelectronic measuring device 1 according to the exemplary embodiments one to four comprises precisely as many measurement channels $M_1, M_2, \ldots, M_m$ as collimators $K_2, K_2, \ldots, K_k$.

Figure 6:
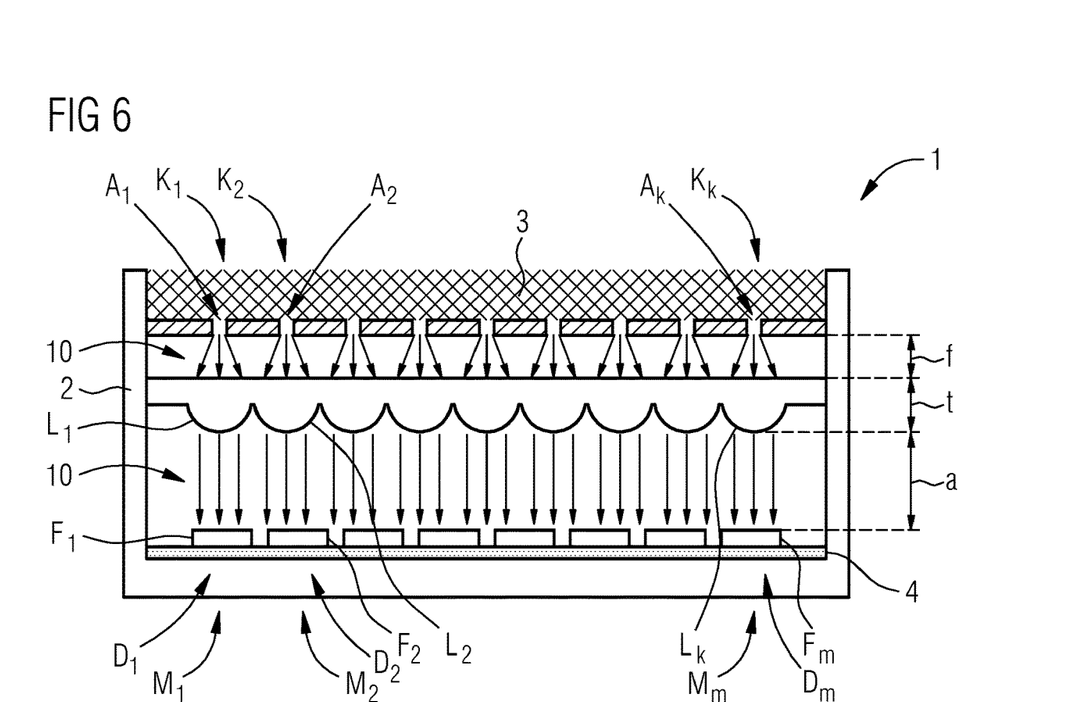
FIG. 6 shows an optoelectronic measuring device according to a first exemplary embodiment.

The optoelectronic measuring device 1 according to a first exemplary embodiment, which is represented in FIG. 6, is constructed substantially similarly to the optoelectronic measuring device 1 according to the second example. In contrast to the optoelectronic measuring device 1 according to the second example, the optoelectronic measuring device 1 according to the first exemplary embodiment comprises k collimators $K_1, K_2, \ldots, K_k$ and m measurement channels $M_1, M_2$, which are arranged to measure an intensity of the electromagnetic radiation 10 collimated by means of the collimators $K_1, K_2, \ldots, K_k$, where k and m are natural numbers and k>m and m≥2. Here, 9 collimators and 8 measurement channels are represented.

Figure 7:
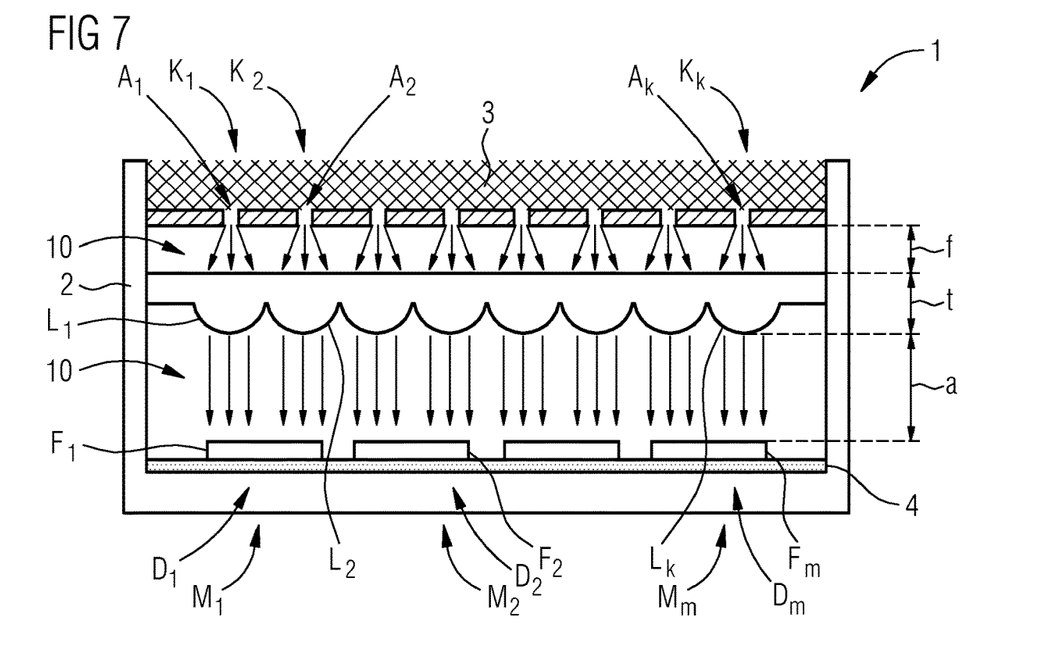
FIG. 7 shows an optoelectronic measuring device according to a second exemplary embodiment.

The optoelectronic measuring device 1 according to a second exemplary embodiment, which is represented in FIG. 7, is constructed substantially similarly to the optoelectronic measuring device 1 according to the second example. In contrast to the optoelectronic measuring device 1 according to the second example, in the optoelectronic measuring device 1 according to the second exemplary embodiment each measurement channel $M_1, M_2, \ldots, M_m$ is assigned precisely 2 collimators $K_1, K_2, \ldots, K_k$, in such a way that the measurement channels $M_1, M_2, \ldots, M_m$ are arranged to register predominantly the electromagnetic radiation 10 collimated by means of the assigned collimators $K_1, K_2, \ldots, K_k$, i.e. at least 50% of the electromagnetic radiation 10 registered by the respective measurement channel $M_1, M_2, \ldots, M_m$ comes from the assigned collimators $K_1, K_2, \ldots, K_k$.

As an alternative thereto, the at least two measurement channels $M_1, M_2, \ldots, M_m$ may respectively be assigned precisely n collimators $K_1, K_2, \ldots, K_k$, where n is a natural number greater than two.

By the use of a plurality of collimators $K_1, K_2, \ldots, K_k$ per measurement channel $M_1, M_2, \ldots, M_m$ according to the first and second exemplary embodiments, the height of the collimators $K_1, K_2, \ldots, K_k$ (focal length f and lens thickness t) may be further reduced. Furthermore, the sensitivity of the optoelectronic measuring device 1 may thereby be increased since more electromagnetic radiation 10 can be guided to the measurement channels $M_1, M_2, \ldots, M_m$. Owing to the assignment of a fixed number of collimators $K_1, K_2, \ldots, K_k$ to each measurement channel $M_1, M_2, \ldots, M_m$ according to the second exemplary embodiment, the collimators $K_1, K_2, \ldots, K_k$ may be aligned identically relative to the measurement channels $M_1, M_2, \ldots, M_m$ for all the measurement channels $M_1, M_2, M_m$, in order straightforwardly to ensure that the same intensity of electromagnetic radiation 10 is present at all the measurement channels $M_1, M_2, \ldots, M_m$.

Figure 8:
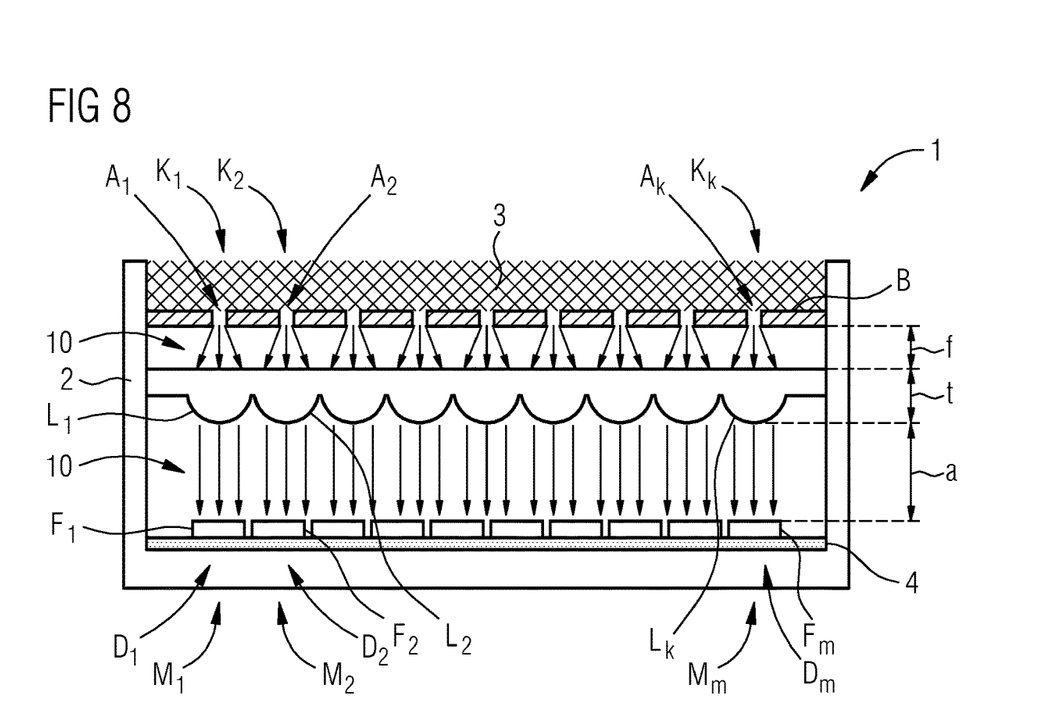
FIG. 8 shows an optoelectronic measuring device according to a fifth example.

The optoelectronic measuring device 1 according to a fifth example, which is represented in FIG. 8, is constructed substantially similarly to the optoelectronic measuring device according to the second example. In contrast to the optoelectronic measuring device 1 according to the second example, the optoelectronic measuring device 1 according to the fifth example comprises k collimators $K_1, K_2, \ldots, K_k$ and m measurement channels $M_1, M_2, M_m$, which are arranged to measure an intensity of the electromagnetic radiation 10 collimated by means of the collimators $K_1, K_2, \ldots, K_k$, where k<m and k≥2. Here, 9 collimators and 10 measurement channels are represented.

Figure 9:
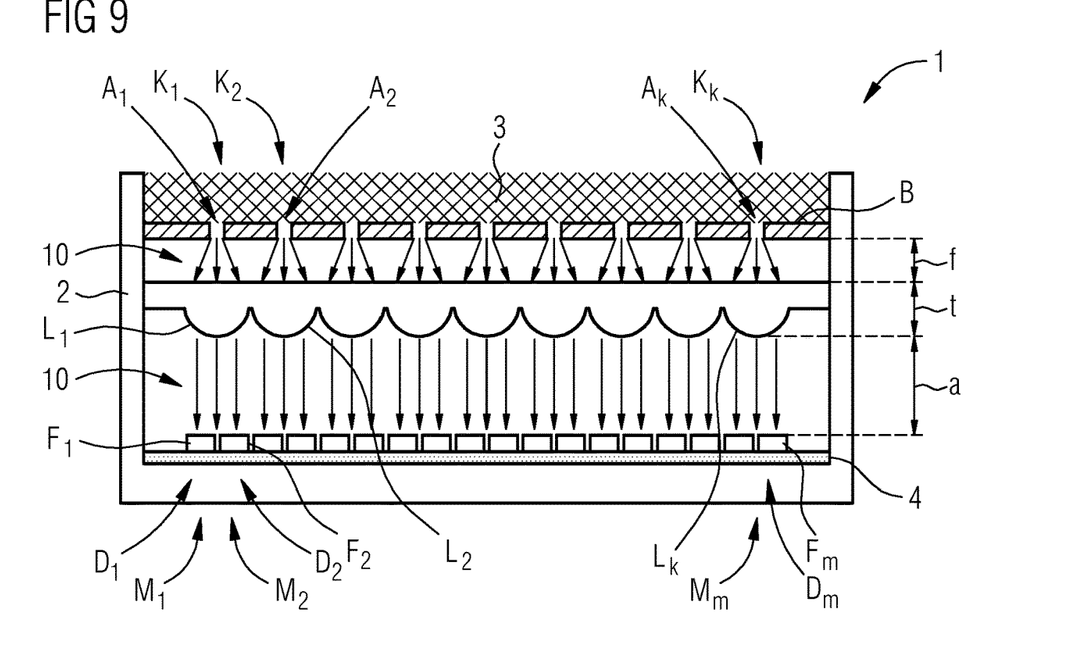
FIG. 9 shows an optoelectronic measuring device according to a sixth example.

The optoelectronic measuring device 1 according to a sixth example, which is represented in FIG. 9, is constructed substantially similarly to the optoelectronic measuring device 1 according to the second example. In contrast to the optoelectronic measuring device 1 according to the second example, in the optoelectronic measuring device 1 according to the sixth example each collimator $K_1, K_2, \ldots, K_k$ is assigned precisely two measurement channels $M_1, M_2, M_m$, in such a way that the measurement channels $M_1, M_2, \ldots, M_m$ are arranged to register predominantly the electromagnetic radiation 10 collimated by means of the two assigned collimators $K_1, K_2, \ldots, K_k$, i.e. at least 50% of the electromagnetic radiation 10 registered by the respective measurement channel $M_1, M_2, \ldots, M_m$ comes from the assigned collimators $K_1, K_2, \ldots, K_k$.

As an alternative thereto, the at least two collimators $K_1, K_2, \ldots, K_k$ may respectively be assigned precisely n measurement channels $M_1, M_2, \ldots, M_m$, where n is a natural number greater than two.

By the use of a plurality of measurement channels $M_1, M_2, \ldots, M_m$ per collimator $K_1, K_2, \ldots, K_k$ according to the fifth and sixth examples, in comparison with the optoelectronic measuring device 1 according to the second example, it is possible to save on collimators $K_1, K_2, \ldots, K_k$ and thereby reduce production costs. By the assignment of a fixed number of measurement channels $M_{11}, M_2, \ldots, M_m$ to each collimator $K_1, K_2, \ldots, K_k$ according to the sixth example, the collimators $K_1, K_2, \ldots, K_k$ may be aligned relative to the measurement channels $M_1, M_2, \ldots, M_m$ in such a way that there is the same intensity of electromagnetic radiation 10 at all the measurement channels $M_1, M_2, \ldots, M_m$.

The above-described optoelectronic measuring devices 1 according to the first and second exemplary embodiments and fifth and sixth examples may, in particular, also be modified in such a way that, as described in connection with the third example, absorption elements 5 are arranged between the collimators $K_1, K_2, \ldots, K_k$. Furthermore, the diaphragm membrane B of the collimators $K_1, K_2, \ldots, K_k$ may, as described in connection with the fourth example, comprise or consist of a layer on the collimation lenses $L_1, L_2, \ldots, L_k$.

The above-described optoelectronic measuring devices 1 according to the first and second exemplary embodiments and fifth and sixth examples may, in a similar way to the second to fourth examples, have at least 5 or at least 10 or at least 50 measurement channels M. Likewise, they may have at least 5 or at least 10 or at least 50 collimators K.

The above-described optoelectronic measuring devices 1 according to the second to sixth examples and the first and second exemplary embodiments may, in particular, also be modified in such a way that, as described in connection with the first example, the collimation lenses $L_1, L_2, \ldots, L_k$ are not monolithically connected to one another. Furthermore, they may also be modified in such a way that the collimators $K_1, K_2, \ldots, K_k$ do not have a common diaphragm membrane B, but rather each collimator $K_1, K_2, \ldots, K_k$ has its own diaphragm membrane B.

In all exemplary embodiments and examples, the collimation lenses $L_1, L_2, \ldots, L_k$ used in the respective exemplary embodiment or example may have different optical properties. In a non-limiting embodiment, they have identical optical properties. Likewise, the collimators $K_1, K_2, \ldots, K_k$ of a respective exemplary embodiment or example may have identical optical properties. The collimation lenses $L_1, L_2, \ldots, L_k$ may, in all exemplary embodiments and examples, comprise glass and/or plastic or consist of glass or consist of plastic. In all exemplary embodiments and examples, the collimation lenses $L_1, L_2, \ldots, L_k$ are transparent for the electromagnetic radiation 10 to be measured.

Figure 10:
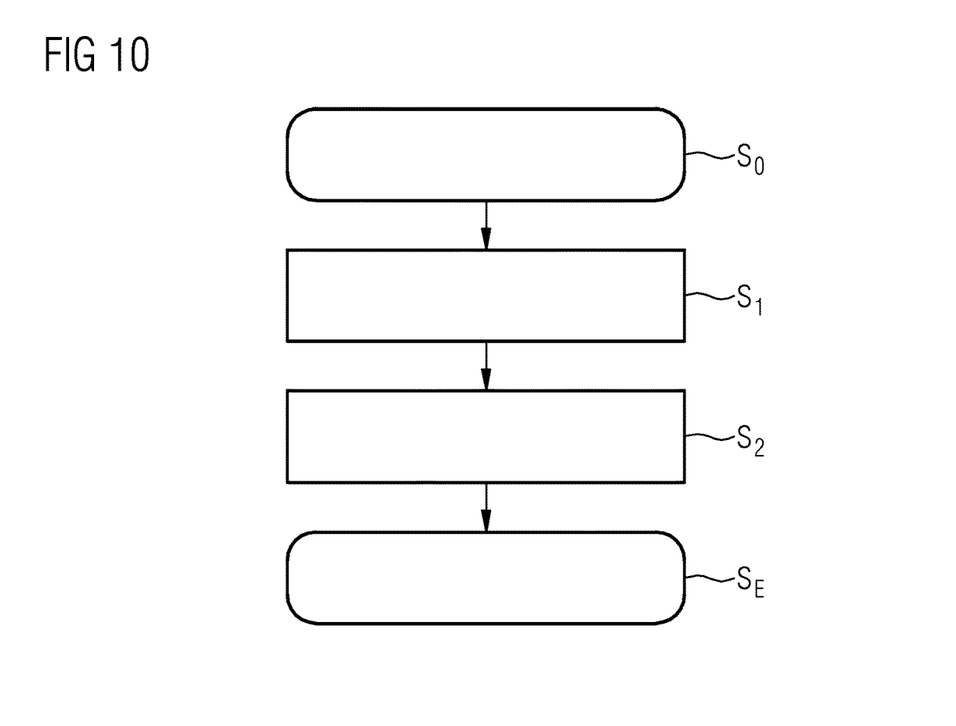
FIG. 10 shows the steps of a method for the frequency-resolved measurement of an intensity of electromagnetic radiation.

FIG. 10 represents a method for the frequency-resolved measurement of an intensity of electromagnetic radiation 10.

It comprises:

S0: "Start",

S1: "Collimation of the electromagnetic radiation (10) by means of at least two collimators ($K_1, K_2, \ldots, K_k$)", S2: "Measurement of the intensity of the electromagnetic radiation (10) by means of at least two measurement channels", SE: "End".

Step S2 is carried out after Step S1. In Step S2, a first of the measurement channels ($M_1$) has a first spectral sensitivity and a further of the measurement channels ($M_2, \ldots, M_m$) has a further spectral sensitivity, which differs from the first spectral sensitivity.

Steps S1 and S2 are carried out in such a way that a separate optical path extends through each of the collimators ($K_2, K_2, \ldots, K_k$) to one or more of the measurement channels ($M_1, M_2, \ldots, M_m$), and each of the measurement channels ($M_2, M_2, \ldots, M_m$) measures the intensity of the electromagnetic radiation (10) collimated by means of one or more of the collimators ($K_1, K_2, \ldots, K_k$).

In the method, more collimators ($K_2, K_2, \ldots, K_k$) will be used for collimating the electromagnetic radiation (10) than measurement channels ($M_2, M_2, \ldots, M_m$) will be used for measuring the intensity.

In the method, an optoelectronic measuring device (1) according to one of the exemplary embodiments described above may be used.

LIST OF REFERENCES 1 optoelectronic measuring device
2 housing
2a housing section 3 scattering element
4 detector array
5 radiation absorption elements
10 electromagnetic radiation
$K_1, K_2, \ldots, K_k$ collimator 1, collimator 2, ..., collimator k
$A_1, A_2, \ldots, A_k$ aperture diaphragm 1, aperture diaphragm 2, ..., aperture diaphragm k
$B_1, B_2$ diaphragm membrane 1, diaphragm membrane 2
B common diaphragm membrane
$L_1, L_2, \ldots, L_k$ collimation lens 1, collimation lens 2, collimation lens k
$M_1, M_2, \ldots, M_m$ measurement channel 1, measurement channel 2, ..., measurement channel m
$D_1, D_2, \ldots, D_m$ radiation detection element 1, radiation detection element 2, radiation detection element m
$F_1, F_2, \ldots, F_m$ spectral filter 1, spectral filter 2, ..., spectral filter m
f focal length
t thickness
a working distance

The invention claimed is:

1. An optoelectronic measuring device for the frequency-resolved measurement of an intensity of electromagnetic radiation, wherein the device comprises:
a plurality of measurement channels, a first measurement channel of the plurality of measurement channels having a first spectral sensitivity and a further measurement channel of the plurality of measurement channels having a further spectral sensitivity different from the first spectral sensitivity, wherein each measurement channel of the plurality of measurement channels comprises precisely one spectral filter; and
two collimators for each measurement channel;
wherein:
each collimator of the two collimators for each measurement channel is configured to collimate the electromagnetic radiations;
a separate optical path extends through each collimator of the two collimators for each measurement channel to one or more of the measurement channels, and each of the measurement channels is arranged to measure an intensity of the electromagnetic radiation collimated by one or more collimators of the two collimators for each measurement channel;
each collimator of the two collimators for each measurement channel comprises a collimation lens and an aperture diaphragm; and
the separate optical paths extending through the two collimators for each measurement channel both extend through the precisely one spectral filter of each measurement channel.

2. The optoelectronic measuring device as claimed in claim 1, wherein each collimator of the plurality of collimators has precisely one collimation lens and precisely one aperture diaphragm.

3. The optoelectronic measuring device as claimed in claim 2, wherein a diaphragm membrane of the aperture diaphragm is monolithically connected to the collimation lens.

4. The optoelectronic measuring device as claimed in claim 1, wherein each collimator of the plurality of collimators includes a collimation lens and an aperture diaphragm, the aperture diaphragms having a common diaphragm membrane.

5. The optoelectronic measuring device as claimed in claim 1, wherein each collimator of the plurality of collimators comprise a collimation lens and an aperture diaphragm, the collimation lenses being monolithically connected.

6. The optoelectronic measuring device as claimed in claim 5, wherein the aperture diaphragms have a common diaphragm membrane, which comprises a layer on the monolithically connected collimation lenses.

7. The optoelectronic measuring device as claimed in claim 1, further comprising at least one radiation absorption element arranged between two collimators of the plurality of collimators.

8. The optoelectronic measuring device as claimed in claim 1, wherein each measurement channel of the plurality of measurement channels has precisely one continuously configured radiation detection element.

9. The optoelectronic measuring device as claimed in claim 8, wherein each radiation detection element is a continuously configured photodiode.

10. The optoelectronic measuring device as claimed in claim 1, further comprising a radiation distribution means configured to distribute the electromagnetic radiation among the plurality of collimators.

11. A method for the frequency-resolved measurement of an intensity of electromagnetic radiation, wherein the method comprises:
collimating the electromagnetic radiation by means of two collimators for each measurement channel; and
measuring the intensity of the electromagnetic radiation by means of a plurality of measurement channels, a first measurement channel of the plurality of measurement channels having a first spectral sensitivity and a further measurement channel of the plurality of measurement channels having a further spectral sensitivity different from the first spectral sensitivity, wherein each measurement channel of the plurality of measurement channels comprises precisely one spectral filter;
wherein:
a separate optical path extends through each collimator of the two collimators for each measurement channel to one or more measurement channels of the plurality of measurement channels, and each measurement channel of the plurality of measurement channels measures the intensity of the electromagnetic radiation collimated by means of one or more collimators of the two collimators for each measurement channel;
wherein each collimator of the two collimators for each measurement channel is configured to collimate the electromagnetic radiation for each measurement channel used for measuring the intensity;
wherein each collimator of the two collimators for each measurement channel comprises a collimation lens and an aperture diaphragm; and
wherein the separate optical paths extending through the two collimators for each measurement channel both extend through the precisely one spectral filter of each measurement channel.

* * * * *